116,142

UNITED STATES PATENT OFFICE.

CARL FREDERICH BINDER, OF PHILADELPHIA, PENNSYLVANIA.

IMPROVEMENT IN PURIFYING PYROLIGNEOUS ACID.

Specification forming part of Letters Patent No. 116,142, dated June 20, 1871.

*To all whom it may concern:*

Be it known that I, CARL FREDERICH BINDER, of Philadelphia, county of Philadelphia, State of Pennsylvania, have invented an Improved Pyroligneous Acid, and Mode of Producing the same, of which the following is a specification:

Nature and Objects of my Invention.

My invention relates to the treatment, described hereafter, of pyroligneous acid; and consists in subjecting its vapors to the action of sulphuric acid and manganese, the light oils being taken up by charcoal, with which the manganese may be mixed. The object of my invention is to obtain a colorless pyroligneous acid, and also to obtain from the crude acid two products, namely, a colorless pyroligneous acid and a highly-concentrated acid, all of which is fully described hereafter.

The figure in the accompanying drawing represents a diagram illustrating apparatus by which my invention may be carried into effect.

General Description.

Ordinary pyroligneous acid is charged with more or less tar and other impurities, and is consequently of a dark-brown color. The object of my invention is to deprive the acid of these impurities, and to render it colorless, and this I accomplish in the following manner: I first distill the ordinary pyroligneous acid by placing it in a wooden vessel, A, containing a steam-heating coil, B. The gases first eliminated from the acid consist mostly of diluted methylic alcohol, which I direct to any suitable condensing apparatus. When all the methylic alcohol has passed off I close the communication of the vessel with the cooler and direct the gases through sulphuric acid contained in a vessel, C, and this acid chars and retains most of the tarry substances.

The apparatus in which this process is conducted should be composed of lead. The vapors, in passing through the sulphuric acid, take up more or less sulphurous acid, which I dispose of by passing the vapor through a mixture of charcoal and powdered manganese contained in a leaden vessel, D. By this process the small quantity of tar remaining in the vapor is decomposed, and the vapor then directed to the cooler E, or to any other suitable condenser, which the acid leaves in a clarified condition, but having a milky appearance, which may be removed by passing the acid through a charcoal filter, or by mixing the acid with powdered soap-stone, and permitting the latter to settle.

A portion of the contents of the still may be evaporated and converted into a colorless pyroligneous acid. The remaining acid in the still A will be concentrated to a strength which renders it more available for many manufacturing purposes, and may be sold without being clarified; or it may be clarified by the process described above, the colorless acid in this case being of greater strength than that derived from the first distillation.

I do not desire to restrict myself to any specific apparatus, as it may be modified, altered, and replaced by other apparatus without departing from the main features of my invention.

I do not claim the treatment of pyroligneous-acid vapor with sulphuric acid, as this has heretofore been practiced; but

I claim—

The treatment of the vapor of pyroligneous acid by subjecting the same to sulphuric acid and manganese, substantially in the manner described In testimony whereof I have signed my name to this specification in the presence of two subscribing witnesses.

CARL FREDERICH BINDER.

Witnesses:
WM. A. STEEL,
LOUIS BOSWELL.